US012746471B2

(12) United States Patent
Dorn et al.

(10) Patent No.: US 12,746,471 B2
(45) Date of Patent: Sep. 29, 2026

(54) SYSTEMS AND METHODS FOR IDENTIFYING A LOCATION OF A SOUND SOURCE

(71) Applicant: Sony Interactive Entertainment Inc., Tokyo (JP)

(72) Inventors: Victoria Dorn, San Mateo, CA (US); Andres Aceves, Harvey, IL (US); David Henshaw, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 133 days.

(21) Appl. No.: 18/778,853

(22) Filed: Jul. 19, 2024

(65) Prior Publication Data

US 2026/0021397 A1 Jan. 22, 2026

(51) Int. Cl.
*A63F 13/54* (2014.01)

(52) U.S. Cl.
CPC ...... *A63F 13/54* (2014.09); *A63F 2300/6081* (2013.01)

(58) Field of Classification Search
CPC ........ A63F 13/10; A63F 13/23; A63F 13/235; A63F 13/25; A63F 13/28; A63F 13/285; A63F 13/30; A63F 13/424; A63F 13/44; A63F 13/45; A63F 13/48; A63F 13/50; A63F 13/54; A63F 13/63; A63F 13/65; A63F 13/73; A63F 13/837; A63F 2300/6081; A63F 9/24; A63F 13/00; A63F 13/212; A63F 13/245; A63F 13/327; A63F 13/42; A63F 13/52; A63F 13/537; A63F 13/57; A63F 13/67; A63F 13/69; A63F 13/75; A63F 13/77; A63F 13/814; A63F 13/843; A63F 13/92; G06T 7/20; G10L 15/02; G10L 21/02; H04S 3/008; H04S 3/002; G07F 17/32
See application file for complete search history.

(56) References Cited

U.S. PATENT DOCUMENTS 6,572,475 B1 * 6/2003 Okabe .................... A63F 13/69 463/30
7,070,500 B1 * 7/2006 Nomi .................... A63F 13/212 463/7
7,815,509 B2 * 10/2010 Yamaya .................. A63F 13/54 463/46
8,187,093 B2 * 5/2012 Hideya .................. A63F 13/54 463/32
8,393,964 B2 * 3/2013 Huang .................. A63F 13/235 463/36

(Continued)

*Primary Examiner* — Gerald Gauthier
(74) *Attorney, Agent, or Firm* — Kilpatrick Townsend & Stockton LLP

(57) ABSTRACT

A method for identifying a location of a sound source is described. The method includes determining whether a predetermined condition regarding the sound source in a game is achieved during a play of the game and modifying first audio data generated based on a first sound received from a player in response to determining that the predetermined condition is achieved. The first audio data is modified in a three-dimensional audio space to output first modified audio data. The player controls the sound source in the game. The method includes providing the first modified audio data via a computer network to a client device to output a first modified sound.

21 Claims, 10 Drawing Sheets

(56) References Cited

U.S. PATENT DOCUMENTS

| | | | | | |
|---|---|---|---|---|---|
| 8,460,101 | B2 * | 6/2013 | Okubo | A63F 13/10 | 463/31 |
| 8,556,722 | B2 * | 10/2013 | Novi | A63F 13/54 | 463/35 |
| 8,958,567 | B2 * | 2/2015 | Tsingos | G10L 21/02 | 381/310 |
| 9,694,282 | B2 * | 7/2017 | Cullen | A63F 13/63 | |
| 10,075,804 | B1 * | 9/2018 | Kawamura | H04S 3/008 | |
| 11,458,404 | B2 * | 10/2022 | Rudi | A63F 13/75 | |
| 2002/0128070 | A1 * | 9/2002 | Miyamoto | A63F 13/10 | 463/43 |
| 2002/0161462 | A1 * | 10/2002 | Fay | A63F 13/10 | 709/217 |
| 2004/0110561 | A1 * | 6/2004 | Kawamura | A63F 13/10 | 463/35 |
| 2005/0014543 | A1 * | 1/2005 | Itoi | A63F 13/45 | 463/8 |
| 2005/0026695 | A1 * | 2/2005 | Tsuchiyama | A63F 13/30 | 463/42 |
| 2005/0096132 | A1 * | 5/2005 | Ueshima | A63F 13/44 | 463/37 |
| 2006/0281547 | A1 * | 12/2006 | Sogabe | A63F 13/54 | 463/35 |
| 2007/0111779 | A1 * | 5/2007 | Osnato | A63F 13/54 | 463/16 |
| 2007/0238500 | A1 * | 10/2007 | Hsiung | A63F 13/92 | 463/1 |
| 2007/0265072 | A1 * | 11/2007 | Matsuda | A63F 13/10 | 463/35 |
| 2007/0293315 | A1 * | 12/2007 | Mizuta | A63F 13/424 | 463/36 |
| 2007/0298879 | A1 * | 12/2007 | Kobayashi | A63F 13/48 | 463/31 |
| 2008/0076498 | A1 * | 3/2008 | Yoshinobu | A63F 13/54 | 463/9 |
| 2008/0102958 | A1 * | 5/2008 | Kitamura | A63F 13/54 | 463/42 |
| 2009/0036210 | A1 * | 2/2009 | Kotani | A63F 13/42 | 463/36 |
| 2009/0082105 | A1 * | 3/2009 | Hegstrom | A63F 13/54 | 463/43 |
| 2009/0170600 | A1 * | 7/2009 | Komatsumoto | A63F 13/45 | 463/43 |
| 2009/0221356 | A1 * | 9/2009 | Matsumoto | A63F 13/67 | 463/20 |
| 2009/0258686 | A1 * | 10/2009 | McCauley | A63F 13/44 | 463/43 |
| 2009/0264181 | A1 * | 10/2009 | Timperley | A63F 9/24 | 463/20 |
| 2009/0318227 | A1 * | 12/2009 | Nakajima | A63F 13/245 | 463/36 |
| 2010/0009746 | A1 * | 1/2010 | Raymond | A63F 13/45 | 463/31 |
| 2010/0099497 | A1 * | 4/2010 | Nagayama | A63F 13/54 | 463/43 |
| 2010/0120531 | A1 * | 5/2010 | Esaki | A63F 13/45 | 463/35 |
| 2010/0137066 | A1 * | 6/2010 | Cheng | A63F 13/57 | 463/37 |
| 2011/0060434 | A1 * | 3/2011 | Bowler | A63F 13/25 | 700/94 |
| 2011/0172017 | A1 * | 7/2011 | Takahashi | A63F 13/235 | 463/39 |
| 2011/0190050 | A1 * | 8/2011 | Mae | A63F 13/327 | 463/31 |
| 2011/0237330 | A1 * | 9/2011 | Asami | A63F 13/5375 | 463/31 |
| 2011/0294577 | A1 * | 12/2011 | Ryu | A63F 13/814 | 463/35 |
| 2012/0077592 | A1 * | 3/2012 | Asami | A63F 13/814 | 463/35 |
| 2012/0129612 | A1 * | 5/2012 | Saito | A63F 13/44 | 463/43 |
| 2012/0238364 | A1 * | 9/2012 | Kurita | A63F 13/50 | 463/31 |
| 2012/0258798 | A1 * | 10/2012 | Cullen | A63F 13/63 | 463/36 |
| 2012/0315988 | A1 * | 12/2012 | Tsuchida | H04S 3/002 | 463/35 |
| 2013/0023343 | A1 * | 1/2013 | Schmidt | A63F 13/54 | 463/35 |
| 2013/0123962 | A1 * | 5/2013 | Mizuta | A63F 13/54 | 700/94 |
| 2013/0260877 | A1 * | 10/2013 | Katagai | A63F 13/73 | 463/29 |
| 2014/0080594 | A1 * | 3/2014 | Osada | A63F 13/25 | 463/31 |
| 2014/0100839 | A1 * | 4/2014 | Arendash | A63F 13/54 | 381/98 |
| 2014/0133681 | A1 * | 5/2014 | Mizuta | A63F 13/54 | 381/300 |
| 2015/0011316 | A1 * | 1/2015 | Morimoto | A63F 13/00 | 463/35 |
| 2015/0348378 | A1 * | 12/2015 | Obana | A63F 13/28 | 700/94 |
| 2016/0129351 | A1 * | 5/2016 | Yuan | A63F 13/30 | 463/31 |
| 2019/0083886 | A1 * | 3/2019 | Taylor | A63F 13/54 | |
| 2019/0362590 | A1 * | 11/2019 | Froy | G07F 17/3209 | |
| 2020/0368616 | A1 * | 11/2020 | Delamont | A63F 13/52 | |
| 2021/0252393 | A1 * | 8/2021 | Suzuki | A63F 13/285 | |
| 2021/0322880 | A1 * | 10/2021 | Baszucki | A63F 13/54 | |
| 2022/0258052 | A1 * | 8/2022 | Kosai | G06T 7/20 | |
| 2022/0362680 | A1 * | 11/2022 | Stafford | A63F 13/23 | |
| 2022/0387886 | A1 * | 12/2022 | Weising | A63F 13/77 | |
| 2023/0068527 | A1 * | 3/2023 | Mahlmeister | A63F 13/424 | |
| 2023/0236792 | A1 * | 7/2023 | Bajaj | G10L 15/02 | 700/94 |
| 2023/0381672 | A1 * | 11/2023 | Henderson | A63F 13/843 | |
| 2024/0024776 | A1 * | 1/2024 | Mccoy | A63F 13/285 | |
| 2024/0024780 | A1 * | 1/2024 | Mccoy | A63F 13/63 | |
| 2024/0091650 | A1 * | 3/2024 | Palacios | A63F 13/65 | |
| 2026/0021397 | A1 * | 1/2026 | Dorn | A63F 13/54 | |

* cited by examiner (Character has low health)

(Method)

(Server-based Gaming)

(Sound Output)

SYSTEMS AND METHODS FOR IDENTIFYING A LOCATION OF A SOUND SOURCE

FIELD

The present disclosure relates to systems and methods for identification of a location of a sound source in a game.

BACKGROUND

A networked multi-player video game supports audio communication between game participants. For example, a Battlefield™ franchise of first person shooter games allow participants to join a team with one or more other players and to communicate with the other members of the team using voice chat.

A video game program code of the multi-player video game is executed on a server and audio communication channels are established between computers to enable voice chat. In this configuration, each user's voice is packetized at a client computer on which the user is playing the game and broadcast to all of the other players on the user's team. However, it is difficult for the players to play the multi-player video game in an efficient and user-friendly manner.

It is in this context that embodiments of the invention arise.

SUMMARY

Embodiments of the present disclosure provide systems and methods for identification of a location of a sound source in a game.

In an embodiment, the a method for augmenting audio of a video game presented to a first player in order to facilitate location of a sound source, such as a virtual character or another virtual object, within a gaming session, such as a single player gaming session or a multi-player gaming session, is described. The virtual character or the other virtual object is controlled by a second player during the gaming session. This is useful in a situation in which the virtual character or the other virtual object is low on health. For example, a communication, such as audio, from the second player, while controlling the virtual character or the other virtual object, is increased or inflated and presented with a directional origin location in a three-dimensional (3D) audio space. As another example, a directional sound output from the second player may be a generic sound or series of sounds that are pulsated for emphasis. The communication from the second player includes any content, and may not necessarily include helpful directions. Also, as another example, a sound output from the video game or from other players, such as the first player and a third player, is reduced for a period of time to highlight the audio from the second player.

In one embodiment, a method for identifying a location of a sound source is described. The method includes determining whether a predetermined condition regarding the sound source in a game is achieved during a play of the game and modifying first audio data generated based on a first sound received from a player in response to determining that the predetermined condition is achieved. The first audio data is modified in a three-dimensional audio space to output first modified audio data. The player controls the sound source in the game. The method includes providing the first modified audio data via a computer network to a client device to output a first modified sound.

In an embodiment, a server system for identifying a location of a sound source is described. The server includes a processor and a memory device coupled to the processor. The processor determines whether a predetermined condition regarding the sound source in a game is achieved during a play of the game and modifies first audio data generated based on a first sound received from a first player in response to determining that the predetermined condition is achieved. The first audio data is modified in a three-dimensional audio space to output first modified audio data. The processor provides the first modified audio data via a computer network to a client device to output a first modified sound.

Some advantages of the herein described systems and methods include modifying audio data to identify a location of the sound source, such as the virtual character in the video game. For example, an amplitude and/or a frequency of the audio data generated based on sounds, such as words, from the second player is increased during an occurrence of a predetermined condition. An example of the predetermined condition is when the second player requests help in case the virtual character has low health or is attacked by enemy virtual characters or virtual monsters or a combination thereof. As another example, a directionality of sound of the second player that is output to the first player via a client device operated by the first player is modified to enhance an effect of the sound towards the first player. To illustrate, instead of outputting the sound of the second player via a television located in the same room in which the first player is located, the sound is output via a headphone that is worn by the first player to enhance the effect of the sound. As another illustration, a value of a parameter, such as an amplitude or a frequency, of the sound of the second player is increased in a left right speaker of the headphone worn by the first player compared to a value of the parameter in a left speaker of the headphone to increase the effect of the sound in the 3D audio space around the first player. The audio data is modified to alert the first player to provide help to the second player to save the virtual character that is controlled by the second player.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for identifying a location of a virtual character are described. It should be noted that various embodiments of the present disclosure are practiced without some or all of these specific details. In other instances, well known process operations have not been described in detail in order not to unnecessarily obscure various embodiments of the present disclosure.

Figure 1A:
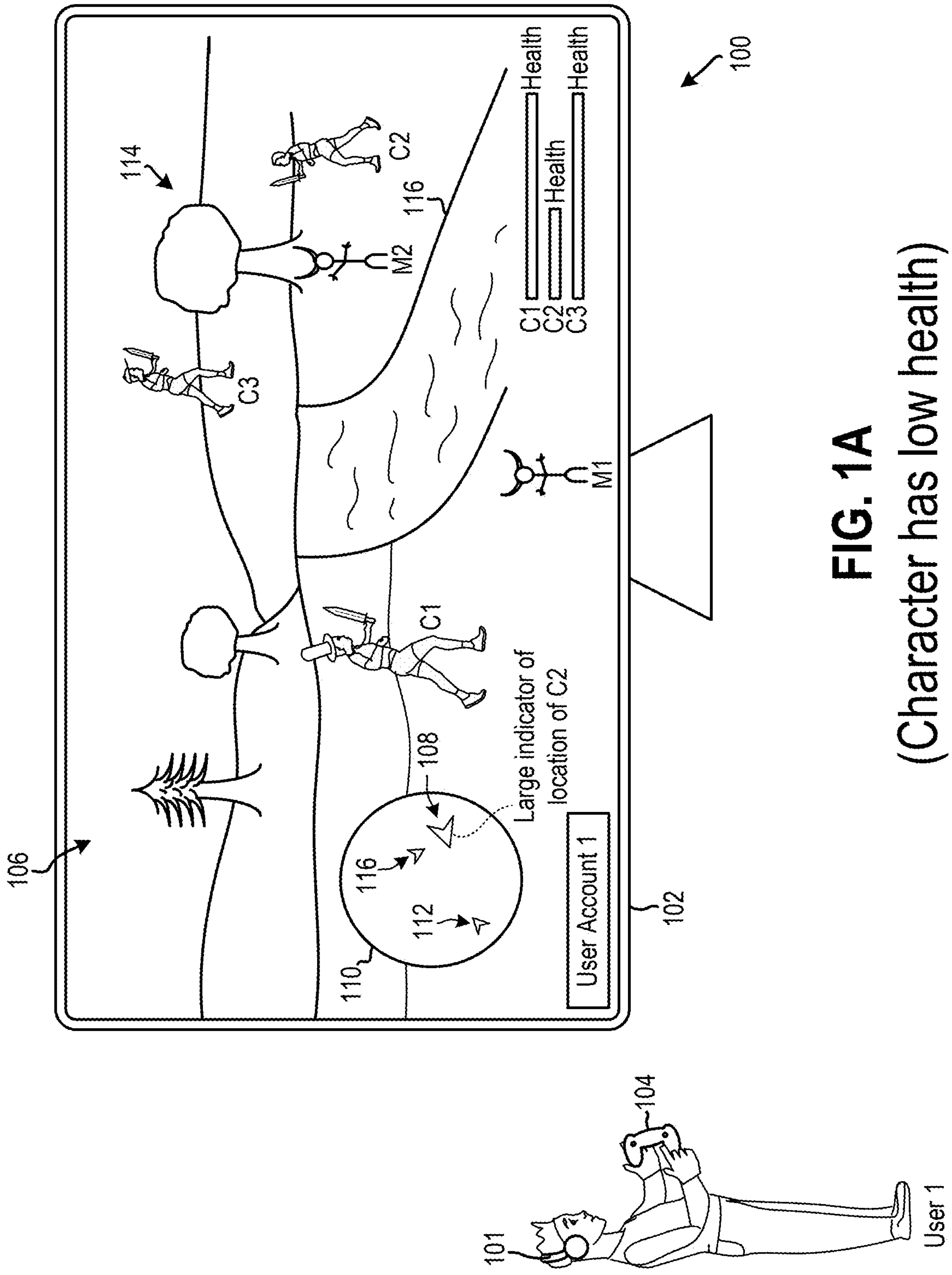
FIG. 1A is an embodiment of a system to illustrate that a sound output from a user who controls a virtual character in a virtual scene is modified when a predetermined condition associated with the virtual character is achieved.
Figure 1B:
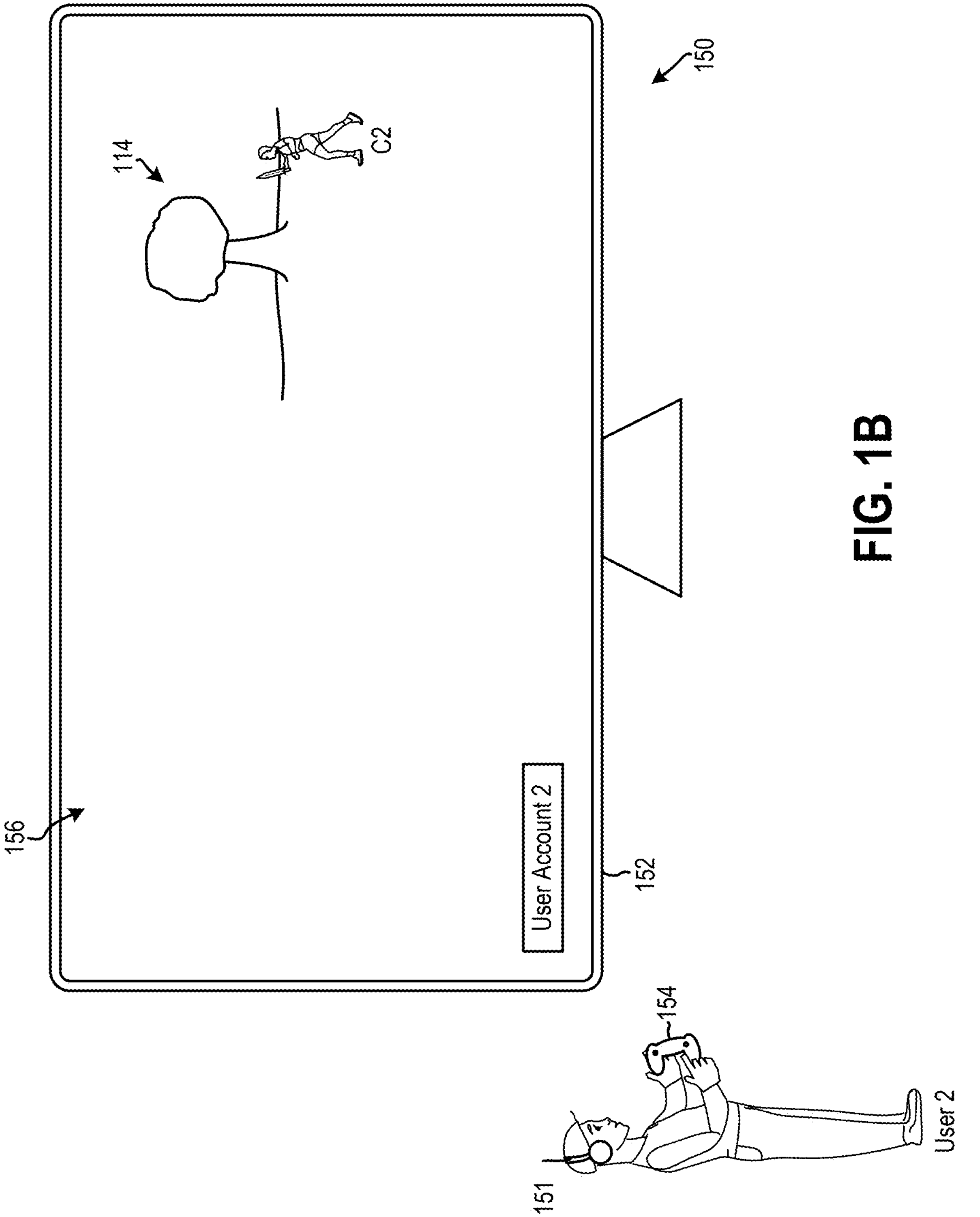
FIG. 1B is an embodiment of a system to illustrate that the sound output from the user who controls the virtual character in the virtual scene is modified when the predetermined condition associated with the virtual character is achieved.

FIG. 1A is an embodiment of a system 100 to illustrate that a sound output from a user 2 (FIG. 1B) who controls a virtual character C2 in a video game, such as a multiplayer video game, is modified when a predetermined condition associated with, such as regarding, the virtual character C2 is achieved. FIG. 1B is an embodiment of a system 150 to illustrate that the sound output from the user 2 is modified. The virtual character C2 is an example of a sound source of interest in the multiplayer video game. Other examples of sound sources of interest include a virtual object, such as a location on a virtual map, or a virtual bird, or a secret virtual item, etc. To illustrate, the sound source of interest is a virtual object in the multiplayer video game or a single player video game that can be controlled by a processor, such as a processor of a server system or a processor of a client device, to output sounds in the multiplayer video game or the single player video game.

Referring to FIG. 1A, the system 100 includes a headphone 101, a display device 102 and a hand-held controller 104. Examples of a display device include a desktop computer, a laptop computer, and a smart television. To illustrate, the display device has a display screen, such as a light emitting diode (LED) screen or a plasma display screen. An example of a hand-held controller includes a PlayStation™ 5 (PS5) gaming controller that includes two handle bars extending from a body, a touch pad, and one or more buttons, such as multiple directional buttons and multiple action buttons. An example of a headphone is a pair of earphones for listening to sound signals.

A user 1 wears the headphone 101 on a head of the user 1 and operates, such as selects, the one or more buttons on the hand-held controller 104 to log into a user account 1. A user is sometimes referred to herein as a player. The user account 1 is assigned to the user 1 by the processor of a server system, examples of which are provided below. Once the user 1 logs into the user account 1, the user 1 accesses the video game having a virtual scene 106. An example of a virtual scene includes a virtual reality scene or an augmented reality scene. In the virtual scene 106, a virtual character C1 is controlled by the user 1 via the hand-held controller 104. The user 1 operates one or more buttons of the hand-held controller 104 to control movement of the virtual character C1 in the video game. Also, the virtual scene 106 includes the virtual character C2 and a virtual character C3. The virtual character C3 is controlled by a user 3 (FIG. 4) via a hand-held controller.

With reference to FIG. 1B, the system 150 includes a display device 152, a headphone 151, and a hand-held controller 154. The virtual character C2 is controlled by the user 2 (FIG. 4) via the hand-held controller 154. To illustrate, the user 2 operates, such as selects, one or more buttons on the hand-held controller 154 operated by the user 2 to log into a user account 2. The user account 2 is assigned to the user 2 by the processor of the server system. Once the user 2 logs into the user account 2, the user 2 accesses the video game having a virtual scene 156. The virtual scene 156 is the same as the virtual scene 106 (FIG. 1A) except that the virtual scene 156 has the user account 2 instead of the user account 1. For example, all virtual objects in the virtual scene 156 are the same as those in the virtual scene 106 and the virtual scene 156 is accessed after accessing the user account 2 instead of the user account 1. The virtual characters C1, C2, and C3 are examples of a virtual object. The user 2 operates one or more buttons of the hand-held controller 154 to control movement of the virtual character C2 in the video game.

The user 2 wears the headphone 151 on a head of the user 2. The headphone 151 receives one or more sounds regarding the video game from the user 2. For example, the user 2 speaks into a microphone of the headphone 151 to provide a sound to the microphone and the microphone converts the sound into audio data. To illustrate, the user 2 utters words, such as, "Help me!", and the utterance is an example of an occurrence of a predetermined condition. Other examples of the predetermined condition are provided below with reference to FIG. 2. A client device, such as the display device 102, operated by the user 2 sends the audio data via a computer network to the processor of the server system. Examples of the computer network include the Internet, or an intranet, or a combination thereof. An example of a client device includes a combination of a headphone, a hand-held controller, and a display device. Another example of the client device includes a combination of a head-mounted display and one or more hand-held controllers.

Referring back to FIG. 1A, the processor of the server system modifies the audio data that is received from the client device operated by the user 2 to output modified audio data and sends the modified audio data via the computer network to a client device operated by the user 1. For example, the display device 102 receives the modified audio data and provides the modified audio data to the headphone 101. Upon receiving the modified audio data, one or more speakers of the headphone 101 convert the modified audio data into one or more modified sounds and provide the one or more sounds to the user 1.

The virtual scene 106 further includes a virtual tree 114, which is an example of a virtual landmark in the virtual scene 106. Also, the virtual scene 106 includes a virtual river 116, which is another example of a virtual landmark in the virtual scene 106. The virtual scene 106 includes a virtual monster M1 and another virtual monster M2 that is attacking the virtual character C2. The virtual character C3, in the virtual scene 106, runs to help the virtual character C2. Also, as indicated in the virtual scene 106, the virtual character C2 has a lower amount of virtual health compared to amounts of virtual health of the virtual characters C1 and C3.

When the virtual character C2 is under attack by the virtual monster M2 and the virtual health of the virtual character C2 is at the lower amount, a sound, such as sound of words "Help me!", output from the user 2 who controls the virtual character C2 and/or a graphical indicator, such as a graphical indicator 108, of a location of the virtual character C2 is modified, such as highlighted or enhanced, by a processor of the server system. For example, a three-dimensional (3D) location of the audio data to be output as sound from the user 2 who controls the virtual character C2 is changed from a first location to a second location by the processor of the server system to be placed closer to the user 1 during a time period in which the virtual character C2 is under attack and the virtual health of the virtual character C2 is of the lower amount. When the 3D location of the audio data is modified, such as from the first location to the second location, the audio data to be output as sound at the second location is modified audio data and the sound is modified sound. The modified sound output from the user 2 who controls the virtual character C2 at the second location is output from one or more speakers of the display device 102 and/or from the one or more speakers of the headphone 101. As an example, the first location is an example of a location in a 3D audio space surrounding cars of the user 1 and the second location is another example of a location in the 3D audio space surrounding the ears of the user 1. To illustrate, the first location is a left speaker of a left earphone, of the headphone 101, that covers a left car of the user 1 and the second location is a right speaker of a right earphone, of the headphone 101, that covers a right ear of the user 1. As another illustration, the first location includes one or more speakers of the display device 102 and the second location includes one or more speakers of the headphone 101.

As yet another example, when the user 1 faces the display device 102, the first location is a first value of a parameter, such as amplitude or frequency, at which the modified sound is output via the left speaker of the headphone 101 to the left ear of the user 1 and the second location is a second value of the parameter at which the modified sound is output via the right speaker of the headphone 101 to the right ear of the user 1. The second value is greater than the first frequency. As still another example, when the user 1 faces the display device 102, the first location is a first value of a parameter, such as amplitude or frequency, at which the modified sound is output via the left and right speakers of the headphone 101 to the ears of the user 1 and the second location is a set of values of the parameter at which the modified sound is output via the left and right speakers of the headphone 101 to the ears of the user 1. The set of values include the first value and a second value. The second value that is output via the right speaker is greater than the first value that is output via the left speaker.

As another example, within the time period in which the predetermined condition exists, the processor of the server system controls a processor of the display device 102 to increase an amplitude of audio data to be output as sound via the one or more speakers of the display device 102. In the example, the audio data with the increased amplitude is modified audio data and the sound generated based on the modified audio data is modified sound. As yet another example, within the time period in which the predetermined condition exists, the processor of the server system controls a processor of the headphone 101 to increase an amplitude of audio data to be output as sound via the one or more speakers of the headphone 101. In the example, the audio data with the increased amplitude is modified audio data and the sound generated based on the modified audio data is modified sound.

As yet another example, a size of the graphical indicator 108 identifying the location of the virtual character C2 is modified, such as increased, by the processor of the server system to increase chances of identifying a location, within the virtual scene 106, of the virtual character C2. The graphical indicator 108 with the increased size is an example of modified visual representation data. The graphical indicator 108 with the increased size is displayed by the display device 102 under control of the processor of the server system within a virtual region 110 in the virtual scene 106. Also, the virtual region 110, which is generated by the processor of the server system, includes a graphical indicator 112 identifying a location, within the virtual scene 106, of the virtual character C1 and includes another graphical indicator 116 identifying a location, within the virtual scene 106, of the virtual character C3. The graphical indicator 108 of the increased size has a larger size compared to sizes of the graphical indicators 112 and 116.

In the video game, upon hearing the modified sound generated based on the sound output from the user 2 who controls the virtual character C2 and/or upon viewing the location of the virtual character C2 after the modification, the user 1 controls the virtual character C1 in the virtual scene 106 to help the virtual character C2. The modified sound output to the user 1 via the headphone 101 and/or the display device 102 is generated based on the modified audio data. The user 1 helps the virtual character C2 by operating the one or more buttons of the hand-held controller 104. For example, the user 1 operates the one or more buttons of the hand-held controller 104 to control the virtual character C1 to run to a location of the virtual character C2 and fight the virtual monster M2.

In one embodiment, instead of the display device 102, a tablet or a mobile device, such as a smart phone, as used.

In an embodiment, instead of the hand-held controller 104, the mobile device is used by the user 1.

In one embodiment, instead of a headphone, a head mounted display (HMD) is used by a user in the same manner in which the headphone is used.

Figure 2A:
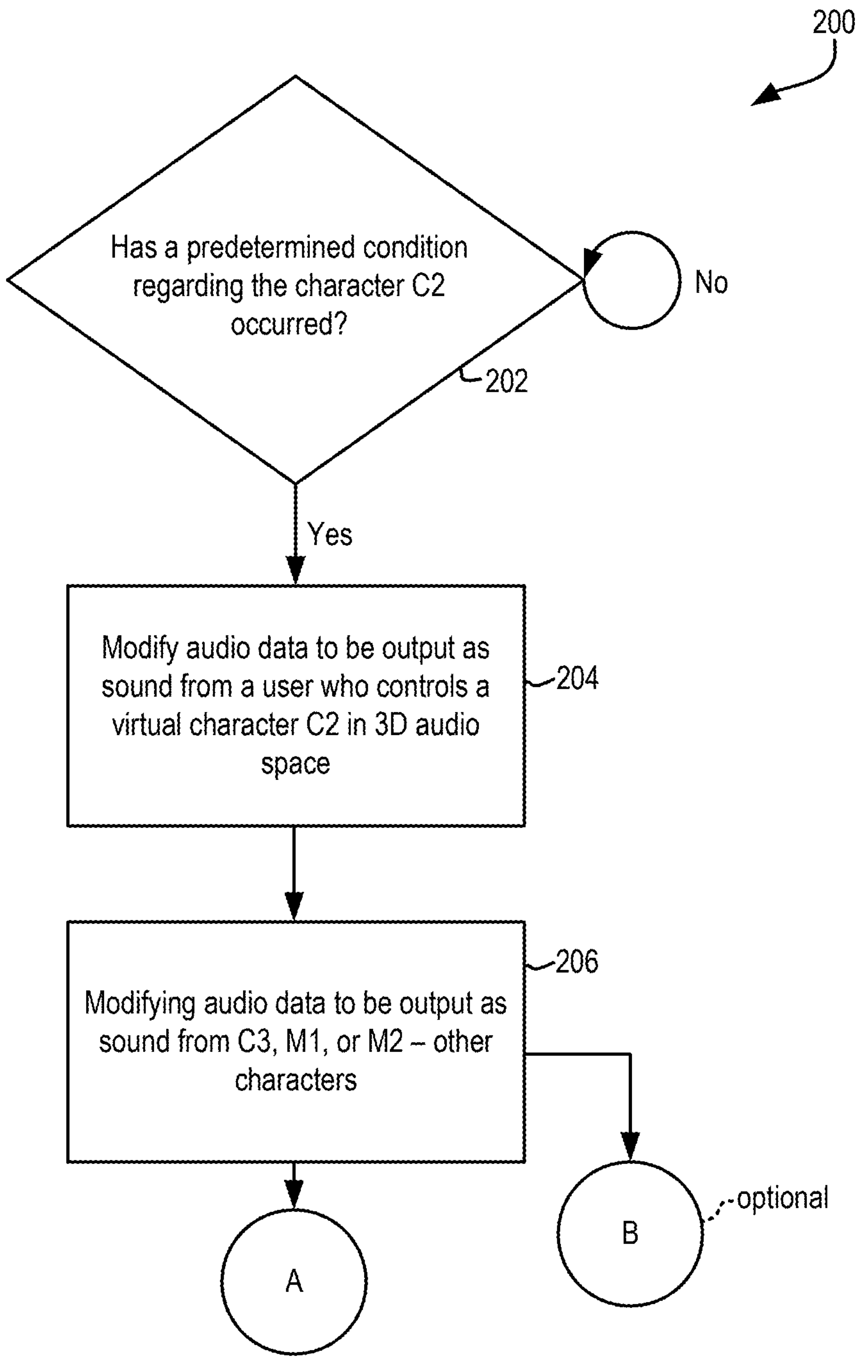
FIG. 2A is an embodiment of a method illustrating modification of sounds output from the user who controls the virtual character, modification of sounds output from one or more remaining users, and modification of sounds output one or more remaining virtual objects in the virtual scene based on an occurrence of the predetermined condition.

FIG. 2A is an embodiment of the method 200 illustrating modification of sounds output from the user 2 who controls the virtual character C2, modification of sounds output from one or more remaining users, such as the user 3, and modification of sounds output one or more remaining virtual objects in the virtual scene 106 (FIGS. 1A and 1B) based on an occurrence of the predetermined condition. The remaining virtual objects in the virtual scene 106 are all virtual objects in the virtual scene 106 except for the virtual character C2. The method 200 is executed by the processor of the server system.

In an operation 202 of the method 200, the processor of the server system determines whether the predetermined condition regarding the virtual character C2 has occurred. For example, the processor of the server system determines whether a predetermined set of words are received from the headphone 151 (FIG. 1B) via the computer network. To illustrate, the processor of the server system determines whether words, such as, "Help me!, uttered by the user 2 are received from the headphone 151 or from the display device 152 via the computer network. Before the words, such as, "Help me!, are received from the display device 152 by the processor of the server system, the headphone 151 communicates the words via a short range network, such as Bluetooth™, to the display device 152. In the example, upon determining that the predetermined set of words are received, the processor of the server system determines that the predetermined condition is occurred. On the other hand, in response to determining that the predetermined awards are not received, the processor of the server system determines that the predetermined condition has not occurred.

As another example, the processor of the server system identifies whether in the virtual scene 106, the virtual character C2 has an amount of health less than a predetermined amount and whether the predetermined set of words are received from the headphone 151. To illustrate, the virtual character C2 has the amount of health less than the predetermined amount when the virtual health of the virtual character C2 is less than one or more amounts of virtual health of one or more of the virtual characters C1 and C3. As another illustration, the virtual character C2 has the amount of health less than the predetermined amount when the virtual health of the virtual character C2 is less than the one or more amounts of virtual health of one or more of the virtual characters C1 and C3 or is less than a preset threshold amount of health or a combination thereof. The preset threshold amount of health is stored in a memory device of the server system. In the example, in response to identifying that the amount of health of the virtual character C2 is less than the predetermined amount and the predetermined set of words are received from the headphone 151, the processor of the server system determines that the predetermined condition has occurred.

On the other hand, in the example, in response to identifying the amount of health of the virtual character C2 is not less than the predetermined amount or the predetermined set of words are not received from the headphone 151, the processor of the server system determines that the predetermined condition has not occurred. To illustrate, the virtual character C2 does not have the amount of health less than the predetermined amount when the virtual health of the virtual character C2 is not less than the virtual health of the virtual character C1 and not less than the virtual health of the virtual character C3. As another illustration, the virtual character C2 does not have the amount of health less than the predetermined amount when the virtual health of the virtual character C2 is not less than the virtual health of the virtual character C1 and not less than the virtual health of the virtual character C3 and is not less than the preset threshold amount of health. In the example, in response to identifying that the amount of health is not less than the predetermined amount, the processor of the server system determines that the predetermined condition has not occurred.

As another example, the processor of the server system identifies that in the virtual scene 106, the virtual character C2 is being attacked by the virtual monster M2 and the amount of virtual health of the virtual character C2 is less than the predetermined amount and the predetermined set of words, such as "Help!" or "Help me!", are received from the client device operated by the user 2. In the example, in response to identifying that the amount of health is less than the predetermined amount and the virtual character C2 is being attacked by the virtual monster M2 and the predetermined set of words are received from the client device operated by the user 2, the processor of the server system determines that the predetermined condition has occurred. On the other hand, in response to identifying the amount of virtual health of the virtual character C2 is not less than the predetermined amount or that the virtual character C2 is not being attacked by the virtual monster M2 or the predetermined set of words are not received from the client device operated by the user 2, the processor of the server system determines that the predetermined condition has not occurred.

Upon determining that the predetermined condition has not occurred, the processor of the server system continues to determine whether the predetermined condition has occurred. On the other hand, in response to determining that the predetermined condition has occurred, an operation 204 of the method 200 is executed by the processor of the server system. In the operation 204, the processor of the server system modifies audio data to control the client device operated by the user 1 to modify a sound to be output from, such as uttered by, the user 2 who controls the virtual character C2. For example, the processor of the server system modifies the 3D location within the 3D audio space from the first location to the second location. To illustrate, when the virtual character C2 is to output the sound having words, "Help me!", the processor of the server system controls the client device operated by the user 1 to mute the sound to be output from the first location and to output of the sound at the second location. The sound output at the second location and the sound muted from the first location is an example of modified sound. As another illustration, when the user 2 who controls the virtual character C2 utters the words, "Help me!", the processor of the server system controls the client device operated by the user 1 to output the audio data generated based on the words from both the first and second locations instead of outputting the audio data as sounds at only the first location. The audio data to be output as the sounds from both the first and second locations is modified audio data. As another example, the processor of the server system modifies, such as increases, an amplitude of the audio data generated based on the sound uttered by the user 2 who controls the virtual character C2 to generate modified audio data.

As yet another example, the processor of the server system pulsates the audio data generated based on the sound uttered by the user 2 who controls the virtual character C2 to generate modified audio data. To illustrate, the processor converts the audio data generated based on the sound uttered by the user 2 who controls the virtual character C2 into a sequence of audio data and lack of audio data to facilitate outputting pulsating audio data. To further illustrate, the audio data generated based on the sound uttered by the user 2 who controls the virtual character C2 is converted into first audio data, followed by no data, followed by second audio data, followed by no data, and so on to create the sequence. The sequence of audio data and lack thereof is the pulsating audio data, which is modified audio data.

As still another example, the processor of server system changes the audio data generated based on the sound uttered by the user 2 who controls the virtual character C2 to facilitate outputting one or more different sounds. To illustrate, the processor of the server system increases an amplitude and/or a frequency of a portion of the audio data generated based on the sound uttered by the user 2 who controls the virtual character C2 and does not modify the remaining portion of the audio data. In the illustration, the amplitude and/or the frequency of audio data having the word, "Help" is increased without increasing an amplitude of the word "me" in the words "Help me!". When the amplitude and/or the frequency of the portion of the audio data is increased without modifying the remaining portion of the audio data, modified audio data is generated. As another illustration, the processor of the server system generates modified audio data by adding audio data to the audio data generated based on the sound uttered by the user 2 who controls the virtual character C2. To further illustrate, the processor of the server system adds audio data including words, such as "Help me!" or "please", to the audio data generated based on the sound uttered by the user 2 who controls the virtual character C2, or adds audio data to the audio data generated based on the sound uttered by the user 2 to control the client device operated by the user 1 to output a high pitch beep sound. As another further illustration, the processor of the server system adds audio data to the audio data generated based on the sound uttered by the user 2 who controls the virtual character C2 to control the client device operated by the user 1 to output multiple high pitch scrolling beeps, or adds audio data indicating a location of the virtual character C2 in the virtual scene 106 to the audio data generated based on the sound uttered by the user 2 who controls the virtual character C2, or a combination thereof. In the illustration, the audio data is added to the audio data, "Help me!", generated based on the sound uttered by the user 2 who controls the virtual character C2. In the illustration, any addition of audio data to the audio data having the words, "Help me!", generated based on the sound uttered by the user 2 who controls the virtual character C2 is done to output modified audio data as modified sound. To further illustrate, instead of controlling the client device operated by the user 1 to output the sound including the words, "Help me!" once, the client device operated by the user 1 is controlled by the processor of the server system to utter the modified audio data having the words, such as "Help me!", twice or is controlled to output the modified audio data having the words, "Help me please!" instead of the words "Help me!", as modified sound.

After the operation 204, an operation 206 is executed by the processor of the server system. In the operation 206, audio data to output one or more sounds, such as background music, from one or more of the remaining virtual objects, such as the virtual character C1, the virtual character C3, the virtual tree 114, the monster M1, the virtual scene 106, the virtual river 116 and the monster M2 (FIG. 1A) and/or audio data generated based on one or more sounds uttered by the one or more remaining users, such as the user 3 or the user 1, of the video game is modified by the processor of the server system to generate modified audio data. For example, the processor of the server system reduces, such as suppresses, one or more amplitudes and/or one or more frequencies of audio data to be output as the one or more sounds from one or more of the remaining virtual characters and/or reduces one or more amplitudes and/or one or more frequencies of audio data generated based on one or more sounds from the one or more remaining users to generate modified audio data. To illustrate, the processor of the server system reduces an amplitude and/or a frequency of audio data that is generated based on sounds uttered by the user 3 during a play of the video game. The amplitude is reduced compared to an amplitude of audio data that is generated based on audio data generated based on sounds uttered by the user 2. The frequency is reduced compared to a frequency of audio data that is generated based on audio data generated based on sounds uttered by the user 2.

As another illustration, the processor of the server system reduces one or more amplitudes and/or one or more frequencies of audio data to be output as the one or more sounds from one or more of the remaining virtual characters that are within a predetermined distance from the virtual character C2 to control the client device to highlight the sound, such as "Help me!", that is output from the client device operated by the user 1. The sound, such as "Help me!", output from the client device operated by the user 1 is generated based on audio data that is generated by the client device operated by the user 2 based on the sound uttered by the user 2. To further illustrate, the processor of the server system compares a distance of one of the remaining virtual characters from the virtual character C2 in the virtual scene 106. In the further illustration, the processor of the server system determines that the distance is less than the predetermined distance. In response to the determination, and the illustration, the processor modifies audio data to be output as sound from the one of the remaining virtual characters. Continuing with the example, the one or more amplitudes and/or one or more frequencies of audio data to be output as the one or more sounds from one or more of the remaining virtual characters and/or the one or more amplitudes and/or one or more frequencies of audio data generated based on one or more sounds from the one or more remaining users are reduced to generate modified audio data. It should be noted that each of or a combination of the virtual tree 114 and the virtual river 116 is an example of a virtual background in the virtual scene 106, and the virtual background is an example of the one or more of the remaining virtual characters.

As another example, the processor of the server system identifies whether the virtual character C1 is getting closer to the virtual character C2. To illustrate, the processor of the server system determines whether input data indicating movement of the virtual character C1 as getting closer to the virtual character C2 in the virtual scene 106 is received. The input data is generated by the hand-held controller 104 (FIG. 1A) when the user 1 selects the one or more buttons on the hand-held controller 104 to control the virtual character C1. Upon determining that the input data is received, the processor of the server system identifies that the virtual character C1 is getting closer to the virtual character C2. In the example, in response to determining that the virtual character C1 is getting closer to the virtual character C2, the processor of the server system determines to add audio data to the audio data that is generated by the client device operated by the user 2 from a sound uttered by the user 2. To illustrate, the audio data that is added includes words, such as, "getting closer" or "good job". When the audio data is added to the audio data that is generated by the client device operated by the user 2 from a sound uttered by the user 2, modified audio data is generated. It should be noted that of the remaining virtual objects is an example of a virtual object associated with the virtual character C2.

It should also be noted that any audio data that is modified in the operation 204 is sometimes referred to herein as modified audio data of the operation 204 and any sound that is modified in the operation 204 is sometimes referred to herein as modified sound of the operation 204. For example, the sound that is generated based on the modified audio data of the operation 204 is modified sound of the operation 204. It should also be noted that any audio data that is modified in the operation 206 is sometimes referred to herein as modified audio data of the operation 206 and any sound that is modified in the operation 206 is sometimes referred to herein as modified sound of the operation 206. For example, the sound that is generated based on the modified audio data of the operation 206 is modified sound of the operation 206.

In one embodiment, the processor of the server system executes the operation 206 before or simultaneous with executing the operation 204. For example, upon determining, in the operation 202, that the predetermined condition regarding the virtual character C2 has occurred, the processor of the server system executes the operation 206 before executing the operation 204 or executes the operations 204 and 206 during the same time period.

In an embodiment, the operation 204 or 206 is not executed.

In one embodiment, the operations 204 and 206 are executed until the predetermined condition continues to exist. For example, after executing or during execution of one or more of the operations 204 and 206, the processor of the server system determines whether the predetermined condition regarding the virtual character C2 still exists. Upon determining that the predetermined condition continues to exist, the processor of the server system continues to perform or performs one or more of the operations 204 and 206. On the other hand, in response to determining that the predetermined condition does not continue to exist, the processor of the server system stops executing or does not execute one or more of the operations 204 and 206. To illustrate, in response to determining that the virtual character C2 is no longer being attacked by the virtual monster M2 or has now an amount of health that is greater than the predetermined amount or the predetermined set of words are not being received from the client device operated by the user 2 or a combination thereof, the processor determines not to modify audio data generated, by the client device operated by the user 2, based on any other sound, such as "Great game!" or "Good luck!" or "Thanks for helping me!", that is uttered by the user 2. The other sound is uttered by the user 2 after the predetermined set of words are uttered by the user 2. To further illustrate, the processor of the server system changes the 3D location at which the other sound is output from the second location to the first location. In the illustration, the other sound that is output is generated based on audio data received from the client device operated by the user 2. Further, in the illustration, the audio data is generated from the other sound, such as "Great game!" or "Good luck!" or "Thanks for helping me!", that is uttered by the user 2. As another example, in response to determining that the virtual character C2 is no longer being attacked by the virtual monster M2 or has an amount of health that is greater than the predetermined amount or the predetermined set of words are not being received from the client device operated by the user 2 or a combination thereof, the processor of the server system determines not to continue modifying audio data to output the modified sound from one or more of the remaining virtual characters in the virtual scene 106. In the example, the audio data is received from the client device operated by the user 2.

Figure 2B:
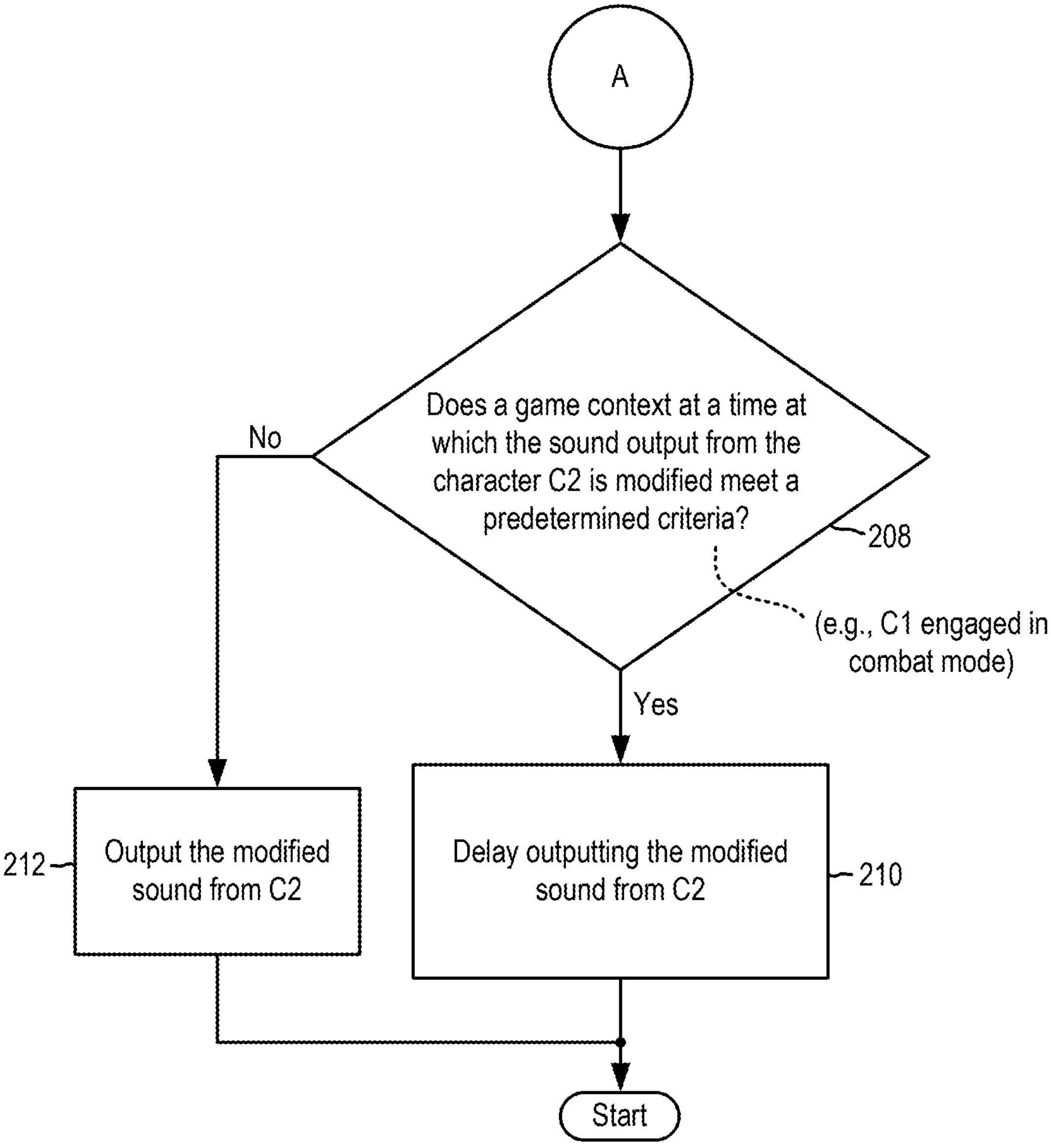
FIG. 2B is a flowchart to illustrate a continuation of the method of FIG. 2A.

FIG. 2B is a flowchart to illustrate a continuation of the method 200 of FIG. 2A. In an operation 208 of the method 200, the processor of the server system determines whether a game context, such as a game context of the virtual scene 106 (FIGS. 1A and 1B), during a time period in which the audio data generated based on a sound uttered by the user 2 is modified, in the operation 204, and/or the audio data to be output as one or more sounds from the one or more of the remaining virtual objects and/or the audio data generated based on sounds uttered by the one or more remaining users is modified, in the operation 206, meet a predetermined criteria. For example, the processor of the server system determines whether, in the virtual scene 106, the virtual character C1 is engaged in a combat mode within the same time interval in which the audio data generated based on a sound uttered by the user 2 is modified, in the operation 204, and/or the audio data to be output as one or more sounds from the one or more of the remaining virtual objects and/or the audio data generated based on sounds uttered by the one or more remaining users is modified, in the operation 206. To illustrate, the processor of the server system determines whether input data is received from the hand-held controller 104 via a computer network during the time period, and if so, whether the input data indicates that the user 1 is controlling the virtual character C1 to fight with a predetermined number of virtual monsters, such as the virtual monster M1 and other virtual monsters (not shown), in the virtual scene 106. In response to determining that the input data indicates that the user 1 controls the virtual character C1 to fight with the predetermined number of virtual monsters, the processor of the server system determines that the virtual character C1 is engaged in the combat mode. On the other hand, upon determining that the input data indicates that the user 1 does not control the virtual character C1 to fight with the predetermined number of virtual monsters, the processor of the server system determines the virtual character C1 is not engaged in the combat mode. The engagement of the virtual character C1 in the combat mode is an example of the predetermined criteria.

As an example, the game context of the virtual scene 106 includes information identifying all virtual objects and their actions in the virtual scene 106. To illustrate, the game context of the virtual scene 106 includes the virtual characters C1 through C3, the virtual monsters M1 and M2, the virtual river 116, the virtual tree 114, the virtual region 110, and the amounts of virtual health of the virtual characters C1 through C3. Further, an illustration, the game context, indicates that the virtual character C1 is holding a virtual sword, the virtual character C2 is holding a virtual sword to fight with the virtual monster M2, the virtual character C3 is holding a virtual sword, the virtual river 116 is flowing, the virtual monster M2 is about to attack or is attacking the virtual character C2, and the virtual monster M1 is about to attack or is attacking the virtual character C1.

As another example, the processor of the server system determines whether input data is received from the hand-held controller 104 via the computer network during the time period, and if so, whether the input data indicates that the user 1 is selecting greater than a predetermined number of buttons on the hand-held controller 104 within a preset time interval. In response to determining that the input data indicates that the user 1 is selecting greater than the predetermined number of buttons within the preset time interval, the processor of the server system determines that the predetermined criteria is achieved. On the other hand, upon determining that the input data indicates that the user 1 is selecting less than the predetermined number of buttons within the preset time interval, the processor of the server system determines that the predetermined criteria is not achieved.

In response to determining that the predetermined criteria is achieved, in an operation 210 of the method 200, the processor of the server system delays outputting the modified sound of the operation 204 and/or the modified sound of the operation 206. For example, the processor of the server system does not provide, for a predetermined amount of time, the modified audio data of the operation 204 and/or the modified audio data of the operation 206 to a network interface controller (NIC) of the server system to transfer the modified audio data of the operation 204 and/or the modified audio data of the operation 206 via the computer network to the client device operated by the user 1. The processor of the server system determines whether the predetermined amount of time has passed. In response to determining that the predetermined amount of time has passed, the processor of the server system sends the modified audio data of the operation 204 and/or the modified audio data of the operation 206 to the network interface controller of the server system.

As another example, the processor of the server system generates and sends an audio delay instruction to a processor of the client device operated by the user 1 to not provide, for the predetermined amount of time, the modified audio data of the operation 204 and/or the modified audio data of the operation 206 to an audio device of the client device operated by the user 1. An example of the audio device is provided below. In the example, the audio delay instruction is sent from the processor of the server system via the computer network to the processor of the client device operated by the user 1. In response receiving the audio delay instruction, the processor of the client device operated by the user 1 sends the modified audio data of the operation 204 and/or the modified audio data of the operation 206 to the audio device of the client device operated by the user 1 after the predetermined amount of time has passed.

The network interface controller of the server system applies a network communication protocol, such as a transmission control protocol over Internet protocol (TCP/IP), to the modified audio data of the operation 204 and/or the modified audio data of the operation 206 and/or one or more instructions, such as the audio delay instruction, received from the processor of the server system to generate one or more network packets. The network interface controller of the server system sends the one or more network packets via the computer network to the client device operated by the user 1.

A network interface controller of the client device operated by the user 1 receives the one or more network packets and applies the network communication protocol to the one or more network packets to extract the modified audio data of the operation 204 and/or the modified audio data of the operation 206 and/or the one more instructions received from the processor of the server system. The network interface controller of the client device operated by the user 1 provides the modified audio data of the operation 204 and/or the modified audio data of the operation 206 and/or the one or more instructions received from the processor of the server system to the processor of the client device operated by the user 1.

The processor of the client device operated by the user 1 provides the modified audio data of the operation 204 and/or the modified audio data of the operation 206 to the audio device of the client device operated by the user 1 to output the modified audio data of the operation 204 as the modified sound of the operation 204 and/or to output the modified audio data of the operation 206 as the modified sound of the operation 206 in accordance with the one or more instructions. For example, the processor of the client device operated by the user 1 provides the modified audio data of the operation 204 and/or the modified audio data of the operation 206 to the audio device of the client device operated by the user 1 after the predetermined amount of time to execute the audio delay instruction received from the processor of the server system. The audio device converts, in a manner described below, the modified audio data of the operation 204 to the modified sound of the operation 204 and/or the modified audio data of the operation 206 to the modified sound of the operation 206. An example of a network interface controller includes a network interface card.

On the other hand, in response to determining that the predetermined criteria is not achieved, the processor of the server system executes an operation 212 of the method 200. In the operation 212, the processor of the server system controls the processor of the client device operated by the user 1 in the same manner as that described in the operation 210 except that there is no delay in outputting the modified sound of the operation 204 and/or the modified sound of the operation 206.

Figure 3A:
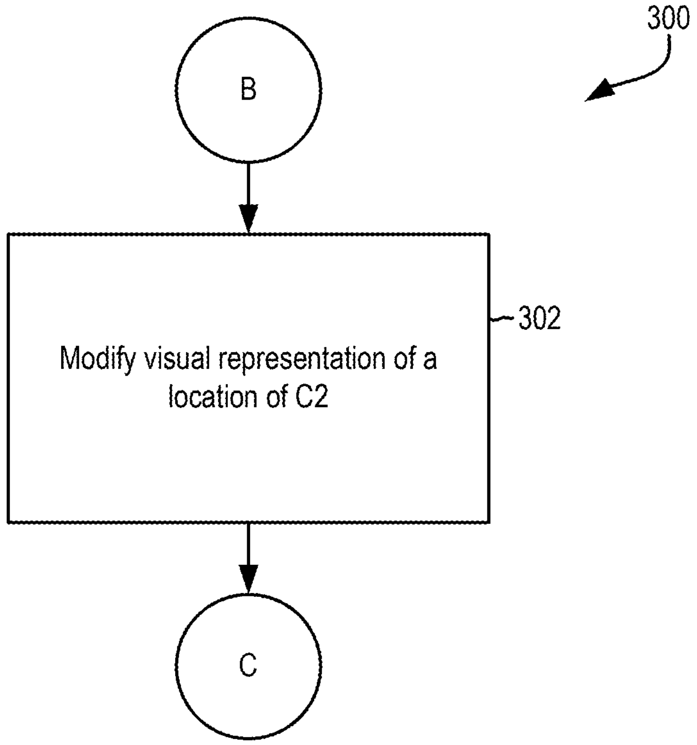
FIG. 3A is a flowchart of an embodiment of a method to illustrate a modification of visual representation data identifying a location of the virtual character.

FIG. 3A is a flowchart of an embodiment of a method 300 to illustrate a modification of visual representation data identifying a location of the virtual character C2. The method 300 is executed by the processor of the server system. An operation 302 of the method 300 follows the operation 204 or 206 of the method 200.

In the operation 302, in response to determining that the predetermined condition regarding the virtual character C2 has occurred, the processor of the server system modifies the visual representation data identifying the location of the virtual character C2. For example, the processor of the server system increases the size of the graphical indicator 108 with respect to sizes of the graphical indicators 112 and 114 (FIG. 1A). As another example, the processor of the server system assigns a different value of a graphical parameter, such as color or shade or intensity, to the graphical indicator 108 compared to values of the graphical parameter assigned to the graphical indicators 112 and 114. As yet another example, the processor of the server system highlights, such as blinks or flickers, the virtual character C2 to modify the visual representation data identifying the location of the virtual character C2. As still another example, the processor of the server system highlights the virtual character C2 compared to one or more of the virtual characters C1 and C3 and the monsters M1 and M2 in the virtual team 106. To illustrate, the processor of the server system assigns a different value of the graphical parameter to, the virtual character C2 compared to values of the graphical parameter assigned to the virtual characters C1 and C3. As yet another example, the processor of the server system blurs, such as reduces visibility of, the one or more of the remaining virtual objects in the virtual scene 106. To illustrate, the processor of the server system controls the client device operated by the user 1 to display the one or more of the remaining virtual objects in the virtual scene as indistinct or vague to highlight the virtual character C2. In the illustration, the virtual character C2 is highlighted to identify a location of the virtual character C2 in the virtual scene 106 compared to the one or more of the remaining virtual objects in the virtual scene 106. The visual representation data identifying the location of the virtual character C2 is modified to generate modified visual representation data of the operation 302, and the modified visual representation data is displayed to output a modified visual representation of the operation 302.

In one embodiment, the operation 302 is optional and not executed by the processor of the server system.

In an embodiment, the operation 302 is performed before the operations 204 and 206 (FIG. 2A).

In one embodiment, the operation 302 is performed after the operation 204 and before the operation 206.

In one embodiment, the operation 302 is executed until the predetermined condition continues to exist. For example, during or after executing the operation 302, the processor of the server system determines whether the predetermined condition regarding the virtual character C2 still exists. Upon determining that the predetermined condition exists, the processor of the server system continues to perform the operation 302. On the other end, in response to determining that the predetermined condition does not continue to exist, the processor of the server system stops executing the operation 302. To illustrate, in response to determining that the virtual character C2 is no longer being attacked by the virtual monster M2 or has an amount of health that is greater than the predetermined amount or the predetermined set of words are not being received or a combination thereof, the processor determines not to continue modifying the visual representation data identifying the location of the virtual character C2.

Figure 3B:
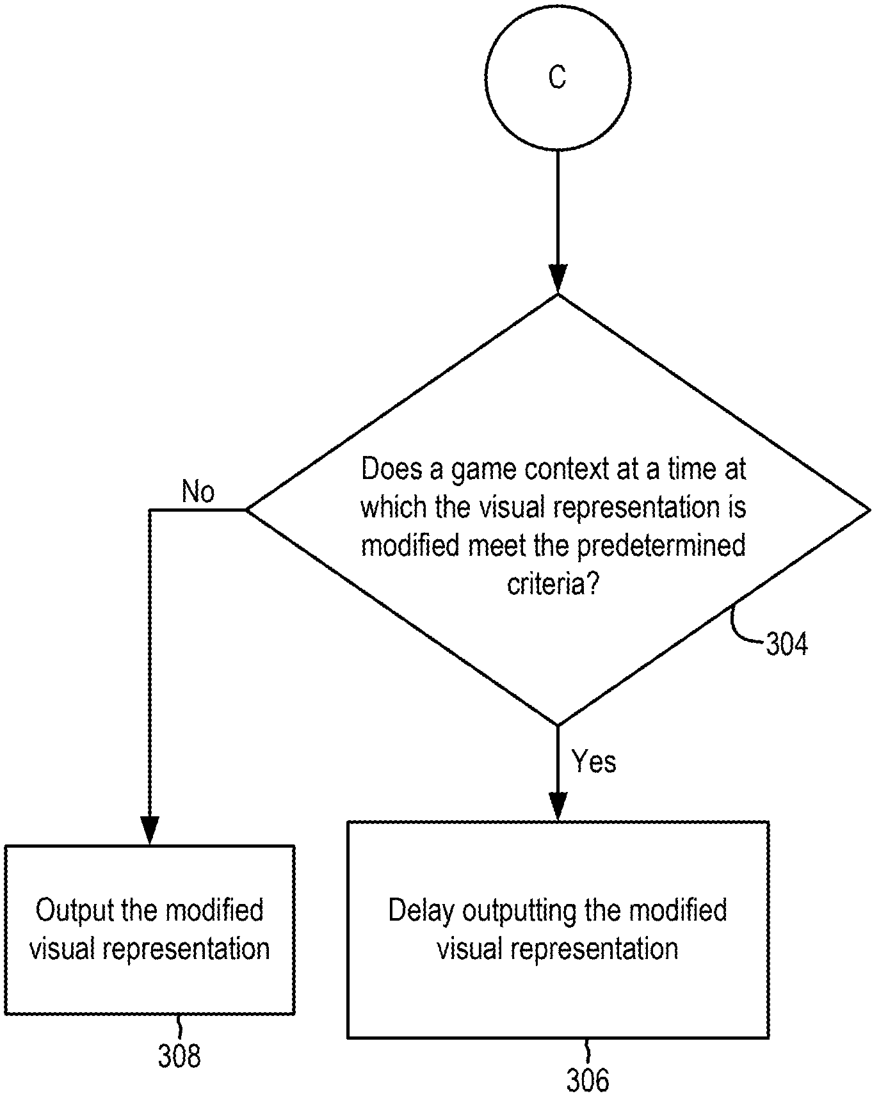
FIG. 3B is a flowchart illustrating a continuation of the method of FIG. 3A.

FIG. 3B is a flowchart illustrating a continuation of the method 300 of FIG. 3A. In an operation 304 of the method 300, the processor of the server system determines whether a game context, such as a game context of the virtual scene 106 (FIGS. 1A and 1B), during a time period in which the visual representation data identifying the location of the virtual character C2 is modified, in the operation 304, meet the predetermined criteria. For example, the processor of the server system determines whether, in the virtual scene 106, the virtual character C1 is engaged in the combat mode within the same time interval in which visual representation data identifying the location of the virtual character C2 is modified, in the operation 304. As an example, the time period in which the visual representation data identifying the location of the virtual character C2 is modified is the same as the time period in which the sound is to be output from the virtual character C2 is modified, in the operation 204, and/or the one or more sounds that are to be output from the one or more of the remaining virtual objects are modified and/or the one or more sounds that are to be output from the one or more of the remaining users are modified, in the operation 206. As another example, the time period in which the visual representation data identifying the location of the virtual character C2 is modified is different from, such as occurs before or after, the time period in which the sound is to be output from the virtual character C2 is modified, in the operation 204, and/or the one or more sounds are to be output from the one or more of the remaining virtual objects are modified and/or the one or more sounds that are to be output from the one or more of the remaining users are modified, in the operation 206

In response to determining that the game context meets the predetermined criteria in the operation 304, the processor of the server system executes an operation 306 of delaying outputting the modified visual representation data of the operation 302. For example, the processor of the server system does not provide, for a predetermined amount of time, the modified visual representation data of the operation 302 to the network interface controller of the server system to transfer the modified visual representation data of the operation 302 via the computer network to the client device operated by the user 1. The processor of the server system determines whether the predetermined amount of time has passed. In response to determining that the predetermined amount of time has passed, the processor of the server system sends the modified visual representation data of the operation 302 to the network interface controller of the server system.

As another example, the processor of the server system generates and sends a visual data delay instruction to the processor of the client device operated by the user 1 to not provide, for the predetermined amount of time, the modified visual representation data of the operation 302 to a graphical processing unit (GPU) of the client device operated by the user 1. In the example, the visual data delay instruction is sent from the processor of the server system via the computer network to the processor of the client device. In response receiving the visual data delay instruction, the processor of the client device operated by the user 1 sends the modified visual representation data of the operation 302 to the GPU of the client device after the predetermined amount of time has passed.

The network interface controller applies the network communication protocol to the modified visual representation data of the operation to generate one or more network packets. The network interface controller sends the one or more network packets having the modified visual representation data of the operation 302 via the computer network to the client device operated by the user 1. The network interface controller of the client device operated by the user 1 receives the one or more network packets having the modified visual representation data of the operation 302 and applies the network communication protocol to the one or more network packets to extract the modified visual representation data. The network interface controller of the client device operated by the user 1 provides the modified visual representation data of the operation 302 to the processor of the client device operated by the user 1.

The processor of the client device operated by the user 1 provides the modified visual representation data of the operation 302 to the GPU of the client device operated by the user 1 for outputting a modified visual representation of the location identifying the virtual character C2. To illustrate, the GPU renders the modified visual representation data of the operation 302 to display the modified visual representation identifying the location of the virtual character C2. As another illustration, the processor of the client device operated by the user 1 executes the visual data delay instruction to provide the modified visual representation data of the operation 302 to the GPU of the client device operated by the user 1 after the predetermined amount of time. Upon receiving the modified visual representation data of the operation 302 after the predetermined amount of time, the GPU renders the modified visual representation data of the operation 302 to display the modified visual representation of the location identifying the virtual character C2 after the predetermined amount of time.

On the other hand, in response to determining that the predetermined criteria is not achieved, the processor of the server system executes an operation 308 of the method 300. In the operation 308, the processor of the server system controls the processor of the client device operated by the user 1 in the same manner as that described in the operation 306 except that there is no delay in outputting the modified visual representation of the operation 302.

In an embodiment, one or more of the operations 202, 204, 206, 208, 210, 212, 302, 304, 306, and 308 are performed at a client device. For example, the operation 202 is executed by the processor of the server system and the operation 204 is executed by a processor of the client device.

Figure 4:
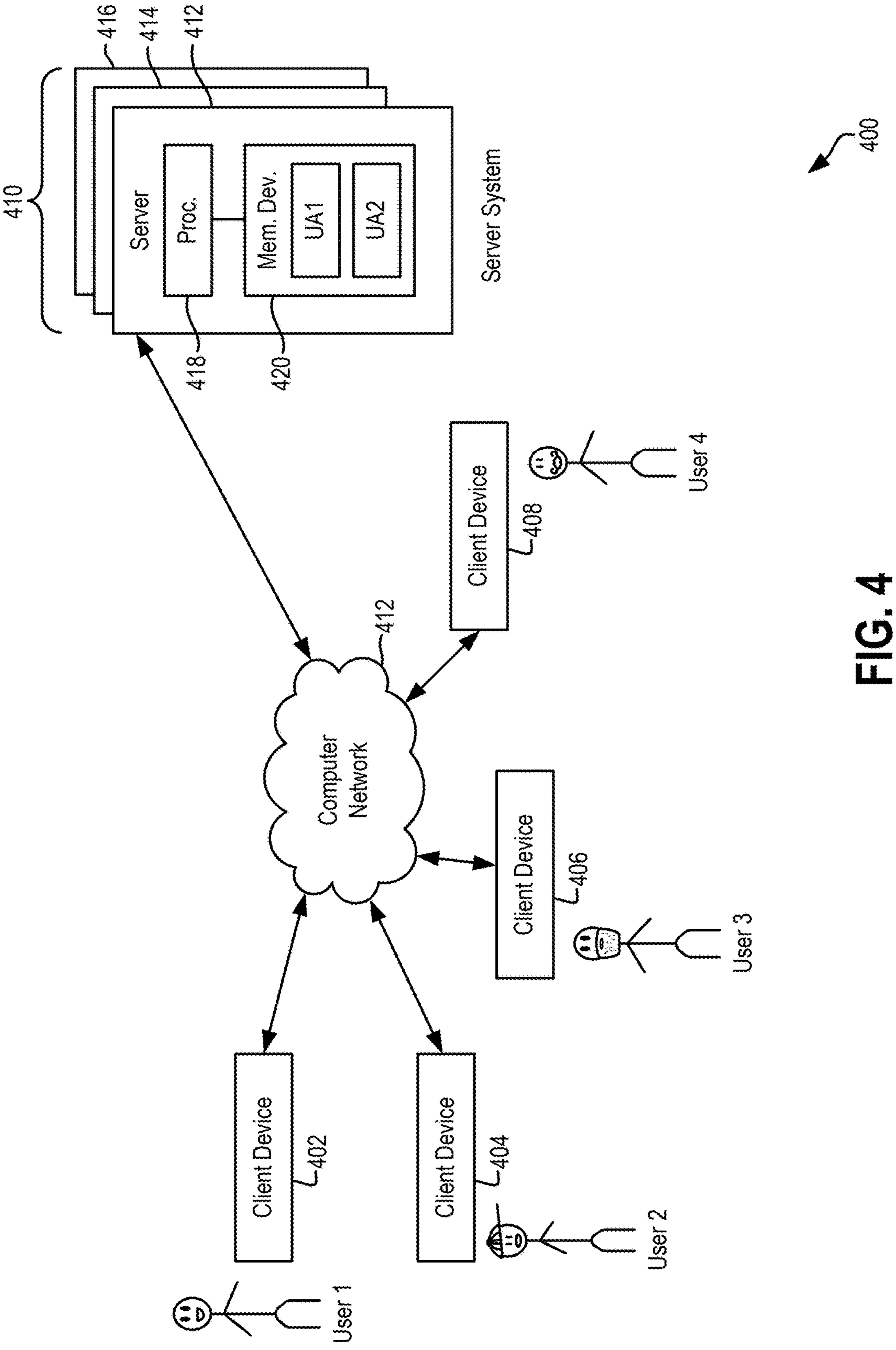
FIG. 4 is a diagram of an embodiment of a system to illustrate multiple client devices coupled to a server system via a computer network.

FIG. 4 is a diagram of an embodiment of a system 400 to illustrate multiple client devices 402, 404, 406, and 408 coupled to a server system 410 via a computer network 412. The client device 402 is an example of the client device operated by the user 1. The client device 404 is an example of the client device operated by the user 2, the client device 406 is operated by the user 3, and the client device 408 is operated by another user 4. Examples of any of the client devices 402, 404, 406, and 408 are provided above. Examples of the computer network 412 are provided above. The server system 410 is an example of the server system that is described above with reference to FIGS. 1-3B. For example, the server system 410 includes one or more servers, such as a server 412, a server 414, and a server 416, and the servers are coupled to each other.

Each server of the server system 410 includes one or more processors and one or more memory devices that are coupled to each other. For example, the server 412 includes a processor 418 and a memory device 420, and the processor 418 is coupled to the memory device 420. Examples of a processor, as used herein, include an application specific integrated circuit (ASIC), a central processing unit (CPU), a GPU, a programmable logic device (PLD), a field programmable gate array (FPGA), a microcontroller, and a microprocessor. Examples of a memory device include a random access memory and a read-only memory. To illustrate, a memory device includes a flash memory or a redundant array of independent disks (RAID) or a combination thereof. The server system 410 is coupled to the client devices 402, 404, 406, and 408 via the computer network 412.

The one or more processors of the server system 410 store, within the one or more memory devices of the server system 410, one or more game programs. Also, the one or more processors of the server system 410 store within the one or more memory devices of the server system 410, user accounts that are assigned to the users 1 through 4. In response to authentication of login information received from one of the client devices 402, 404, 406, and 408, one of the game programs is executed by the one or more processors of the server system 410 to provide access to the video game to one of the users 1 through 4 via the respective one of the client devices 402, 404, 406, and 408.

Figure 5A:
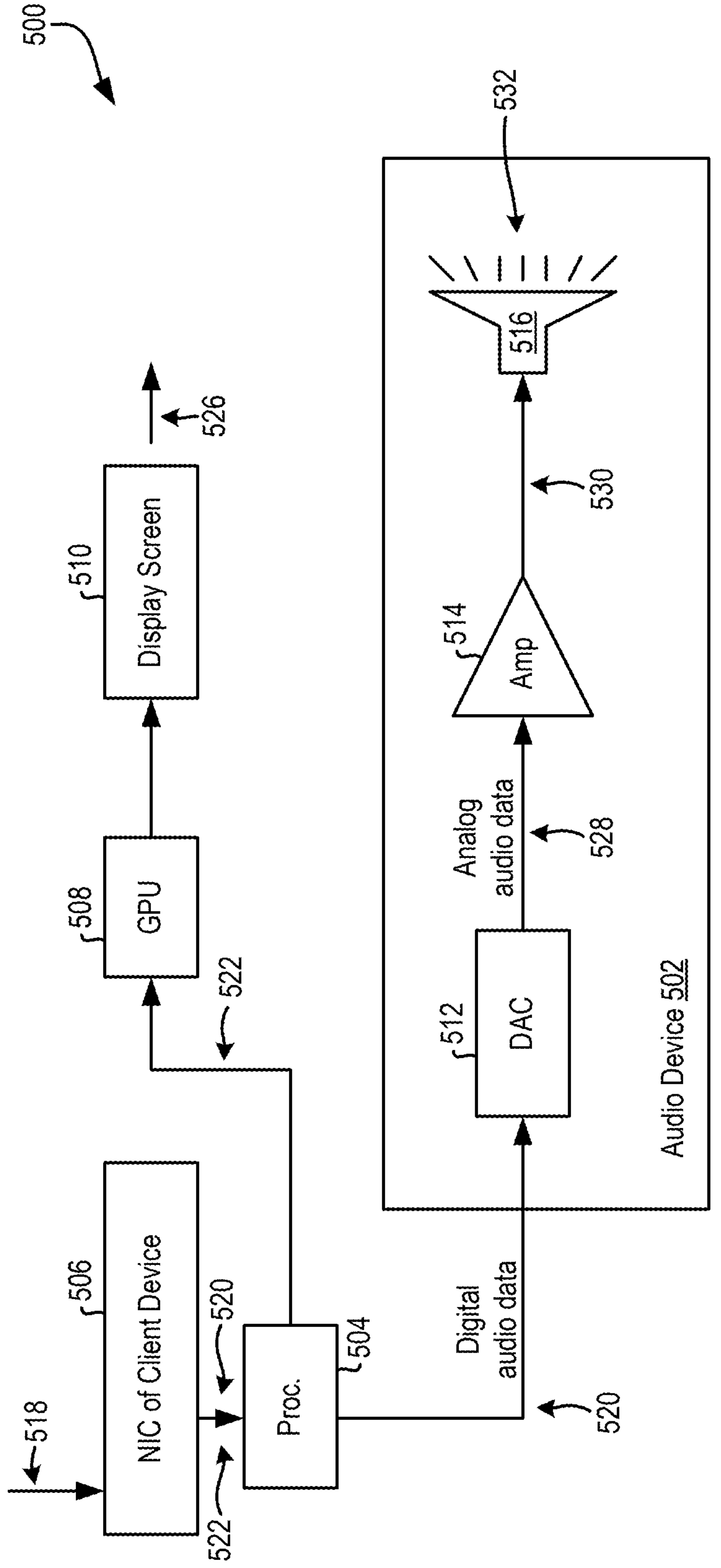
FIG. 5A is a diagram of an embodiment of a client device to illustrate outputting of modified audio data of an operation as a modified sound of the operation, outputting of the modified audio data of another operation as a modified sound of the other operation, and modified visual representation data of yet another operation as a modified visual representation of the yet another operation.

FIG. 5A is a diagram of an embodiment of a client device 500 to illustrate outputting of the modified audio data of the operation 204 (FIG. 2A) as the modified sound of the operation 204, outputting of the modified audio data of the operation 206 (FIG. 2A) as the modified sound of the operation 206, and the modified visual representation data of the operation 302 as the modified visual representation of the operation 302. The client device 500 includes an audio device 502, a processor 504, a network interface controller 506, a GPU 508, and a display screen 510. The client device 500 is an example of any of the client devices 402, 404, 406, and 408 (FIG. 4). The audio device 502 includes a digital to analog converter (DAC) 512, an amplifier 514, and a speaker 516. Examples of the display screen 510 include a plasma display screen, a liquid crystal display (LCD) screen, and a light emitting diode (LED) display screen. An example of the processor 504 is a central processing unit (CPU). An example of the speaker 516 includes the left speaker or the right speaker of the headphone 101 (FIG. 1A). Another example of the speaker 516 includes a speaker of the display device 102 (FIG. 1A).

The processor 504 is coupled to the network interface controller 506 and to the DAC 512. The DAC 512 is coupled to the amplifier 514, which is coupled to the speaker 516. Also, the processor 504 is coupled to the GPU 508, which is coupled to the display screen 510. A combination of the GPU 508 and the display screen 510 is an example of a display device, such as the display device 102 (FIG. 1A).

The network interface controller 506 receives one or more network packets 518, examples of which are provided above, from the server system 410 (FIG. 4) via the computer network 412, and applies the network communication protocol to identify and extract modified audio data 520 from the one or more network packets 518. Examples of the modified audio data 520 includes the modified audio data of the operation 204 (FIG. 2A) and the modified audio data of the operation 206 (FIG. 2A).

It should be noted that the audio device 502 is an audio device of a display device or of a headphone. For example, when the modified audio data 520 is the modified audio data of the operation 204, the audio device 502 is an audio device of the headphone 101 (FIG. 1A). In the example, on the other hand, when the modified audio data 520 is the modified audio data of the operation 206, the audio device 502 is an audio device of the display device 102 (FIG. 1A). As another example, regardless of whether the modified audio data 520 is the modified audio data of the operation 204 or 206, the audio device 504 is an audio device of the headphone 101. As yet another example, regardless of whether the modified audio data 520 is the modified audio data the operation 204 or 206, the audio device 504 is an audio device of the display device 102.

The network interface controller 506 applies the network communication protocol to identify and extract modified visual representation data 522 from the one or more network packets 518. An example of the modified visual representation data 522 includes the modified visual representation data of the operation 302 (FIG. 3A).

The network interface controller 506 provides the modified audio data 520 and the modified visual representation data 522 to the processor 504. The processor 504 distinguishes between the modified visual representation data 522 and the modified audio data 520. For example, the one or more network packets 518 include a first indication that the modified audio data 520 is audio data and a second indication that the modified visual representation data 522 is graphical data. The first indication identifies that the modified audio data 520 is audio data and the second indication identifies that the modified visual representation data 522 is graphical data. Each of the first indication and the second indication is generated by the one or more processors of the server system 410. The processor 504 identifies based on the first indication that the modified audio data 520 is audio data in based on the second indication that the modified visual representation data 522 is visual representation data.

The processor 504 provides the modified visual representation data 522 to the GPU 508. In response to receiving the modified visual representation data 522, the GPU 508 renders the modified visual representation data 522 to display a modified visual representation 526. An example of the modified visual representation 526 is a sequence of one or more images based on the modified visual representation data 522. To illustrate, the one or more images of the modified visual representation 526 are displayed to display the virtual scene 106 (FIG. 1A) having the modified visual representation of the operation 302 (FIG. 3A).

Also, the processor 504 provides the modified audio data 520 to the DAC 512 of the audio device 502. The DAC 512 converts the modified audio data 520 from a digital format to an analog format to output analog audio data 528. The analog audio data 528 is amplified by the amplifier 514 to output amplified analog audio data 530. For example, an amplitude of the analog audio data 528 is modified, such as increased or decreased, by the amplifier 514. The speaker 516 converts the amplified analog audio data 530 into a modified sound 532 to output the modified sound 532. An example of the modified sound 532 includes the modified sound of the operation 204. Another example of the modified sound 532 includes the modified sound of the operation 206. As an example, the processor 504 controls the display screen 510 and the audio device 502 to output the modified visual representation 526 in synchronization with the modified sound 532. To illustrate, the processor 504 provides the modified audio data 520 to the DAC 512 within a predetermined time period from a time at which the modified visual representation data 522 is sent to the GPU 508. To further illustrate, the modified audio data 520 is sent from the processor 504 to the DAC 512 at the same time at which the modified visual representation data 522 is sent from the processor 504 to the GPU 508.

In one embodiment, in addition to the speaker 516, one or more speakers are coupled to the amplifier 514 to output sounds that are output from the speaker 516.

In an embodiment, in addition to the audio device 502, one or more audio devices are coupled to the processor 504 to output sounds that are output from the speaker 516.

Figure 5B:
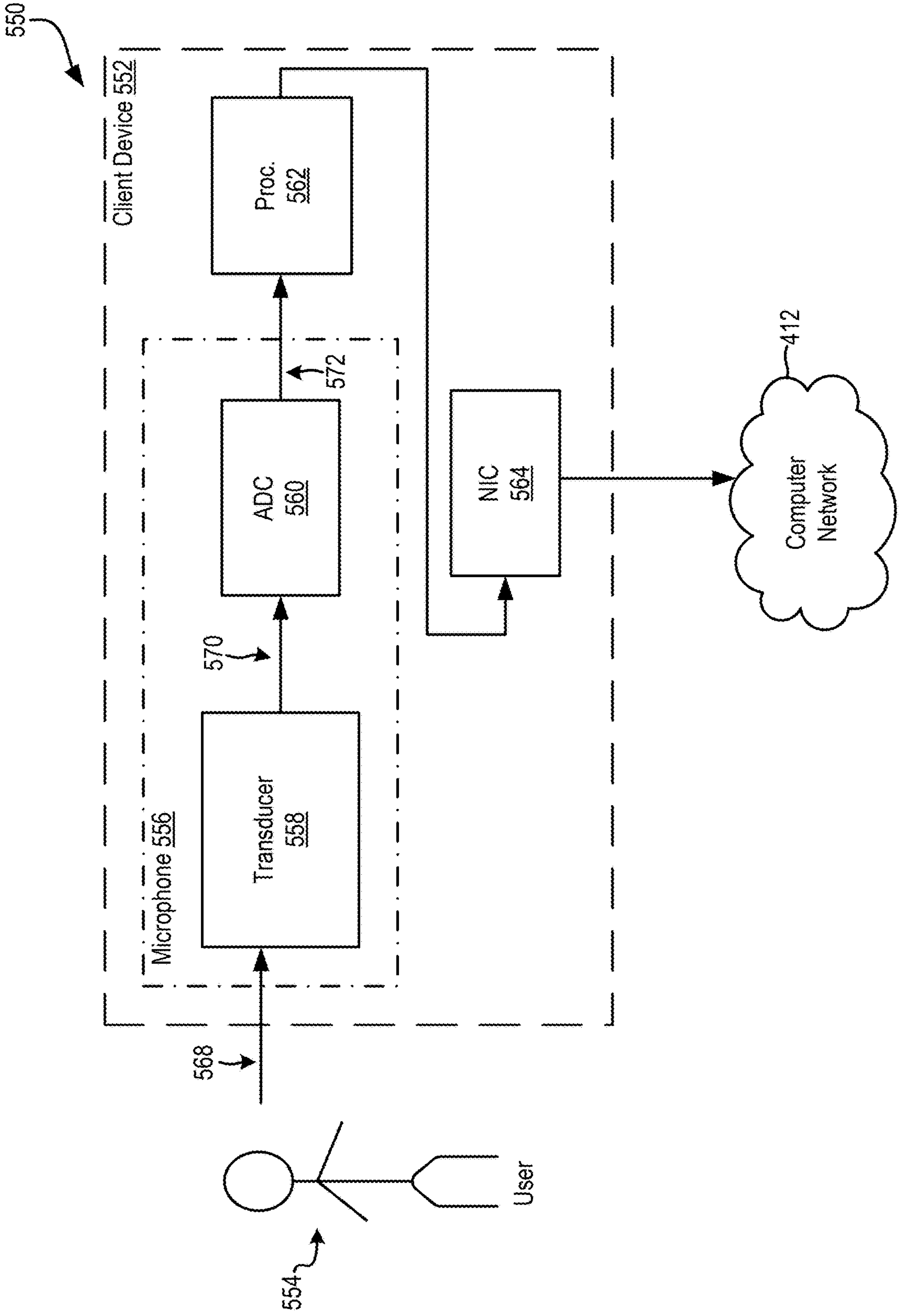
FIG. 5B is a diagram of an embodiment of a system to illustrate conversion of sound into audio data at one of the client devices.

FIG. 5B is a diagram of an embodiment of the system 550 to illustrate conversion of sound into audio data. The system 550 includes a client device 552 and the computer network 412. The client device 552 is any of the client devices 402, 404, 406, and 408 (FIG. 4). A user 554 operates the client device 552. The user 554 is an example of any of the users 1 through 4 (FIG. 4).

The client device 552 includes a microphone 556, which includes a transducer 558 and an analog to digital converter (ADC) 560. As an example, the microphone 556 is located within a headphone, such as the headphone 151 (FIG. 2) or another headphone, which is worn by the user 554. As another example, the microphone 556 is located within a display device, such as the display device 152 (FIG. 1B) or another display device, operated by the user 554. The client device 552 further includes a processor 562 and a NIC 564. The transducer 550 is coupled to the ADC 560, which is coupled to the processor 562. The processor 562 is coupled to the NIC 564 and the NIC 564 is coupled to the computer network 412.

The transducer 558 receives a sound 568 output, such as uttered, by the user 554 and converts the sound 568 into audio signals 570. The ADC 560 converts the audio signals 570 from an analog form to a digital form to output audio data 572. The audio data 572 is generated based on the sound 568 uttered by the user 554. The processor 562 receives the audio data 572 from the ADC 560 and provides the audio data 572 to the NIC 564. The NIC 564 applies the network communication protocol to the audio data 572 to generate one or more network packets and sends the one or more network packets via the computer network 412 to the processor of the server system.

It should be noted that although the systems and methods, described herein, are described with reference to the virtual character C2 in a multiplayer game, the systems and methods are equally applicable to any sound source of interest, such as, a next location on a virtual map in a single player video game or a multiplayer video game, or a secret virtual item in the single player video game or the multiplayer video game.

Figure 6:
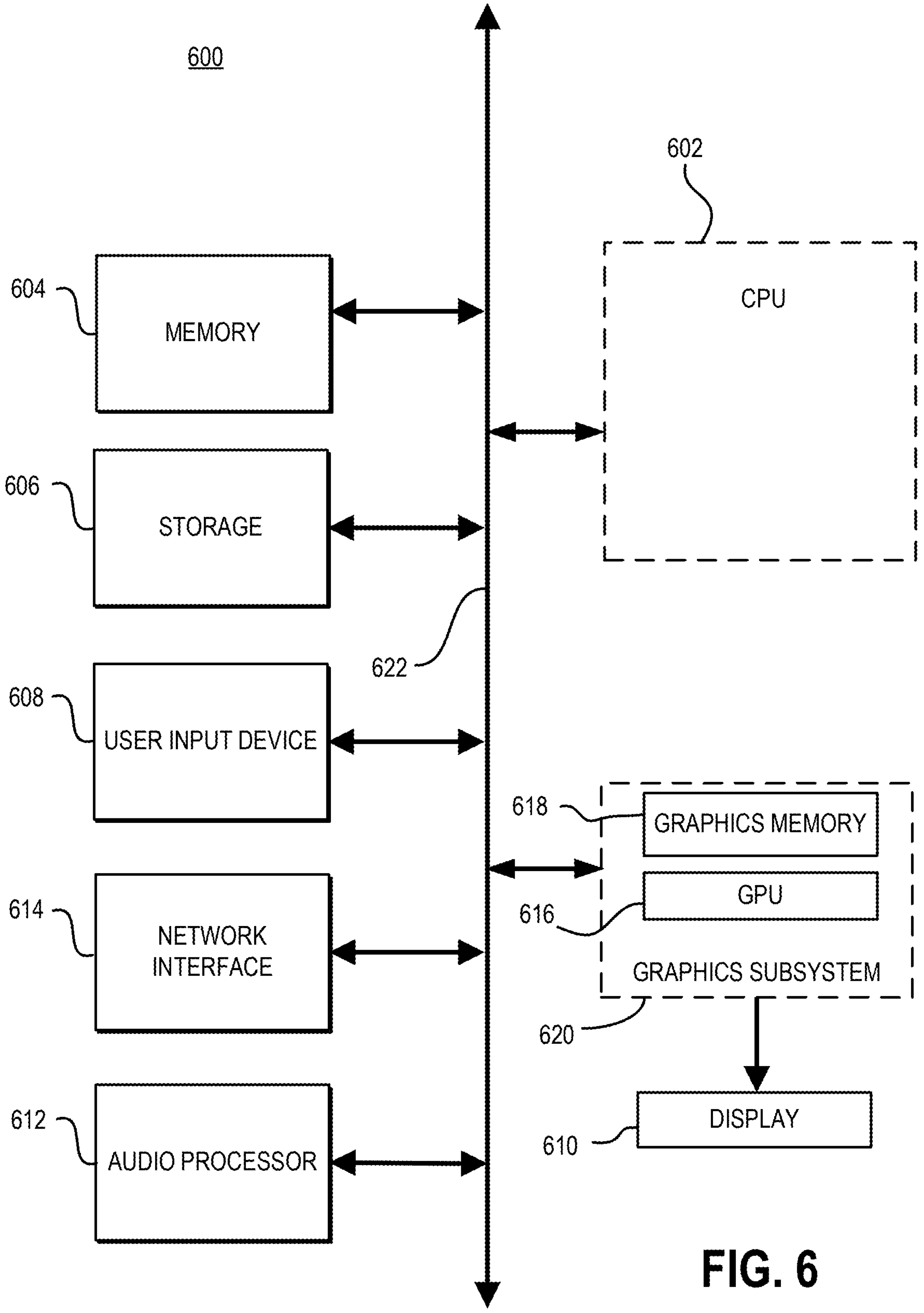
FIG. 6 illustrates components of an example device, such as one of the client devices or a server system, described herein, that can be used to perform operations of the various embodiments of the present disclosure.

FIG. 6 illustrates components of an example device 600, such as a client device or a server system, described herein, that can be used to perform aspects of the various embodiments of the present disclosure. This block diagram illustrates the device 600 that can incorporate or can be a personal computer, a smart phone, a video game console, a personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player, such as a user, described herein, playing a game segment (e.g., game console), or remote from the player (e.g., back-end server processor), or one of many servers using virtualization in a game cloud system for remote streaming of gameplay to clients.

A memory 604 stores applications and data for use by the CPU 602. A storage 606 provides non-volatile storage and other computer readable media for applications and data and may include fixed disk drives, removable disk drives, flash memory devices, compact disc-read only memory (CD-ROM), digital versatile disc-ROM (DVD-ROM), Blu-ray, high definition-digital versatile disc (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614, such as a NIC, allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a GPU 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUS.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include a computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for identifying a location of a sound source, comprising:

determining whether a predetermined condition regarding the sound source in a game is achieved during a play of the game, wherein the sound source is a virtual character;

modifying first audio data generated based on a first sound received from a first player in response to determining that the predetermined condition is achieved, wherein the first audio data is modified in a three-dimensional audio space to output first modified audio data, wherein the first player controls the sound source in the game; and providing the first modified audio data via a computer network to a second player client device to output a first modified sound.

2. The method of claim 1, wherein said modifying the first audio data includes changing a location of output of the first audio data as the first sound, or increasing an amplitude of the first audio data, or increasing a frequency of the first audio data, or pulsating the first audio data, or adding another audio data to the first audio data, or a combination of two or more thereof.

3. The method of claim 1, comprising modifying second audio data to be output as a second sound from a virtual object in the same virtual scene as that the sound source in response to determining that the predetermined condition is achieved.

4. The method of claim 3, comprising:

determining whether the virtual object is within a predetermined distance from the sound source, wherein the second audio data to be output as the second sound from the virtual object is modified upon determining that the virtual object is within the predetermined distance, wherein the second audio data to be output as the second sound from the virtual object is modified to generate second modified audio data.

5. The method of claim 1, wherein the predetermined condition comprises a status of the virtual character meeting a specified criterion and receiving a predefined audio input.

6. The method of claim 3, wherein said modifying the second audio data to be output as the second sound from the virtual object includes reducing an amplitude of the second audio data to be output as the second sound from the virtual object to decrease an amount of the second sound to be output from the virtual object.

7. The method of claim 1, comprising:

determining a game context of the second player client device; and, wherein said providing the first modified audio data occurs after a contextual delay in response to determining that the game context meets a predetermined criteria.

8. The method of claim 1, comprising:

modifying visual representation data identifying a location of the sound source in response to determining that predetermined condition is achieved, wherein the visual representation data is modified to output modified visual representation data; and providing the modified visual representation data via the computer network to the client device for display of a modified visual representation.

9. The method of claim 8, comprising:

determining whether a game context of a virtual scene in which the sound source is displayed meets a predetermined criteria, wherein said providing the modified visual representation data occurs after a delay in response to determining that the game context meets the predetermined criteria.

10. A server system for identifying a location of a sound source, comprising:

a processor configured to:

determine whether a predetermined condition regarding the sound source in a game is achieved during a play of the game, wherein the sound source is a virtual character;

modify first audio data generated based on a first sound received from a first player in response to determining that the predetermined condition is achieved, wherein the first audio data is modified in a three-dimensional audio space to output first modified audio data; and provide the first modified audio data via a computer network to a second player client device to output a first modified sound; and a memory device coupled to the processor.

11. The server system of claim 10, wherein to modify the first audio data, the processor is configured to change a location of output of the first audio data as the first sound, or increase an amplitude of the first audio data, or increase a frequency of the first audio data, or pulsate the first audio data, or add another audio data to the first audio data, or a combination of two or more thereof.

12. The server system of claim 10, wherein the processor is configured to modify second audio data to be output as a second sound from a virtual object in the same virtual scene as that the sound source in response to determining that the predetermined condition is achieved.

13. The server system of claim 12, wherein the processor is configured to:

determine whether the virtual object is within a predetermined distance from the sound source in the virtual scene, wherein the second audio data to be output as the second sound from the virtual object is modified upon determining that the virtual object is within the predetermined distance, wherein the second audio data to be output as the second sound from the virtual object is modified to generate second modified audio data.

14. The server system of claim 10, wherein the predetermined condition comprises a status of the virtual character meeting a specified criterion and receiving a predefined audio input.

15. The server system of claim 12, wherein to modify the second audio data to be output as the second sound from the virtual object, the processor is configured to reduce an amplitude of the second audio data to be output as the second sound from the virtual object to decrease an amount of the second sound to be output from the virtual object.

16. The server system of claim 10, wherein the processor is configured to:

determine a game context of the second player client device; and wherein the first modified audio data is provided after a contextual delay in response to determining that a game context meets the predetermined criteria.

17. The server system of claim 10, wherein the processor is configured to:

modify visual representation data identifying a location of the sound source in response to determining that the predetermined condition is achieved, wherein the visual representation data is modified to output modified visual representation data; and provide the modified visual representation data via the computer network to the client device for display of a modified visual representation.

18. The server system of claim 17, wherein the processor is configured to:

determine whether a game context of a virtual scene in which the sound source is displayed meets a predetermined criteria, wherein the modified visual representation data is provided after a delay in response to determining that the game context meets the predetermined criteria.

19. A non-transitory computer readable medium containing program instructions for identifying a location of a sound source, wherein execution of the program instructions by one or more processors of a computer system causes the one or more processors to carry out operations comprising:

determining whether a predetermined condition regarding the sound source in a game is achieved during a play of the game, wherein the sound source is a virtual character;

modifying first audio data generated based on a first sound received from a first player in response to determining that the predetermined condition is achieved, wherein the first audio data is modified in a three-dimensional audio space to output first modified audio data, wherein the first player controls the sound source in the game; and providing the first modified audio data via a computer network to a second player client device to output a first modified sound.

20. The non-transitory computer readable medium of claim 19, wherein the operations include modifying second audio data to be output as a second sound from a virtual object associated with the sound source in response to determining that the predetermined condition is achieved.

21. The non-transitory computer readable medium of claim 20, wherein the operations include determining whether the virtual object is within a predetermined distance from the sound source in a virtual scene, wherein the second audio data to be output as the second sound from the virtual object is modified upon determining that the virtual object is within the predetermined distance, wherein the second audio data to be output as the second sound from the virtual object is modified to generate second modified audio data.

* * * * *